United States Patent
Zhu et al.

(10) Patent No.: US 11,635,611 B2
(45) Date of Patent: Apr. 25, 2023

(54) FREEFORM SURFACE OPTICAL TELESCOPE IMAGING SYSTEM

(71) Applicants: Tsinghua University, Beijing (CN); HON HAI PRECISION INDUSTRY CO., LTD., New Taipei (TW)

(72) Inventors: Jun Zhu, Beijing (CN); Rui-rui Tang, Beijing (CN); Wei-Chen Wu, Beijing (CN); Guo-Fan Jin, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 307 days.

(21) Appl. No.: 16/999,228

(22) Filed: Aug. 21, 2020

(65) Prior Publication Data
US 2021/0215924 A1    Jul. 15, 2021

(30) Foreign Application Priority Data
Jan. 15, 2020    (CN) .......................... 202010041031.7

(51) Int. Cl.
*G02B 23/02* (2006.01)
*G02B 23/16* (2006.01)
*G02B 5/10* (2006.01)

(52) U.S. Cl.
CPC .............. *G02B 23/02* (2013.01); *G02B 5/10* (2013.01); *G02B 23/16* (2013.01)

(58) Field of Classification Search
CPC .......... G02B 23/02; G02B 5/10; G02B 23/16

USPC ........................................................ 359/399
See application file for complete search history.

(56) References Cited

U.S. PATENT DOCUMENTS

| 2011/0085235 A1* | 4/2011 | Cook ................. G02B 17/0652 359/366 |
| 2011/0304824 A1* | 12/2011 | Lechner ................. G03B 21/62 359/449 |
| 2016/0282600 A1 | 9/2016 | Spencer |

FOREIGN PATENT DOCUMENTS

| CN | 105334607 | 2/2016 |
| CN | 106371200 | 2/2017 |
| CN | 107850770 | 1/2020 |

* cited by examiner

*Primary Examiner* — Marin Pichler
*Assistant Examiner* — Mitchell T Oestreich
(74) *Attorney, Agent, or Firm* — ScienBiziP, P.C.

(57) ABSTRACT

A freeform surface optical telescope imaging system is provided. The freeform surface optical telescope imaging system comprises a primary mirror, a secondary mirror, a compensating mirror, and a spherical mirror. The primary mirror, the secondary mirror, the compensating mirror, and the spherical mirror are spaced from each other. A surface shape of each of the primary mirror and the secondary mirror is a quadric surface. The primary mirror is used as an aperture stop. A surface shape of the compensating mirror is a freeform surface. A surface shape of the spherical mirror is a spherical surface. A light emitted from a light source would be reflected by the primary mirror, the secondary mirror, the compensating mirror, and the spherical mirror to form an image on an image plane.

15 Claims, 3 Drawing Sheets

FREEFORM SURFACE OPTICAL TELESCOPE IMAGING SYSTEM

CROSS-REFERENCE TO RELATED APPLICATIONS

This application claims all benefits accruing under 35 U.S.C. § 119 from China Patent Application No. 202010041031.7 filed on Jan. 15, 2020, in the China National Intellectual Property Administration, the contents of which are hereby incorporated by reference.

FIELD

The present disclosure relates to a freeform optical telescope imaging system.

BACKGROUND

An optical performance of an optical system is related to numerous factors. It is commonly found that it is difficult to improve one optical parameter without changing the other properties of the system. When compared with refractive systems, reflective systems offer the advantages of high transmission, an absence of chromatic aberrations, and larger aperture sizes. Therefore, reflective systems are widely used in a space detection field. A Ritchey-Chretien (R-C) telescope system is a coaxial reflective design containing two hyperboloidal mirrors that can correct spherical aberrations and coma defects very well within narrow fields. While a field-of-view of the R-C telescope is narrow, it still serves as the prototype for most astronomical telescopes because of its simple structure and remarkable image quality. Improvements in the field-of-view of the R-C telescope have been commonly pursued by designers for many years. For example, some designers added a refractive lens to improve the field-of-view; however, this could lead to a narrow working spectrum and low optical transmission.

BRIEF DESCRIPTION OF THE DRAWINGS

Implementations of the present technology will now be described, by way of embodiment, with reference to the attached figures.

DETAILED DESCRIPTION

Figure 1:
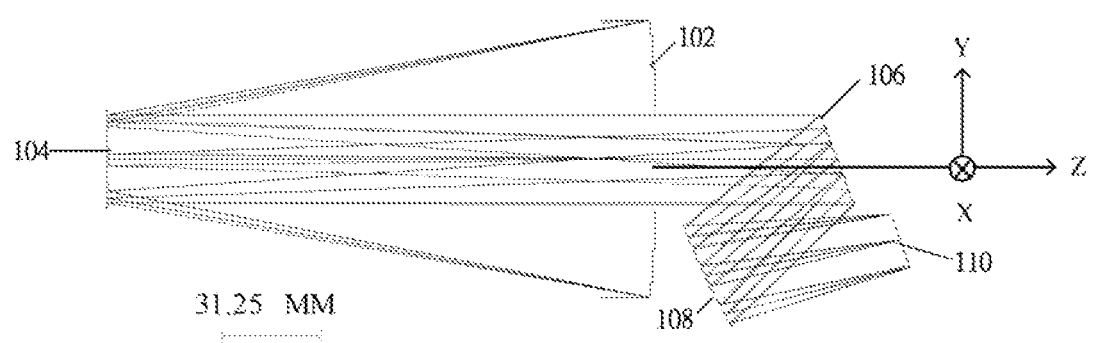
FIG. 1 is a view of one embodiment of a freeform optical telescope imaging system.

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one".

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to illustrate details and features of the present disclosure better.

Several definitions that apply throughout this disclosure will now be presented.

The term "comprise" or "comprising" when utilized, means "include or including, but not necessarily limited to"; it specifically indicates open-ended inclusion or membership in the so-described combination, group, series, and the like.

Referring to FIG. 1, a freeform surface optical telescope imaging system 100 according to one embodiment is provided. The freeform surface optical telescope imaging system 100 comprises a primary mirror 102, a secondary mirror 104, a compensating mirror 106, and a spherical mirror 108. The primary mirror 102, the secondary mirror 104, the compensating mirror 106, and the spherical mirror are spaced away from each other. A surface shape of each of the primary mirror 102 and the secondary mirror 104 is a quadric surface. The primary mirror 102 is used as an aperture stop. A surface shape of the compensating mirror 106 is a freeform surface. A surface shape of the spherical mirror 108 is a spherical surface. A light emitted from a light source would be reflected by the primary mirror 102, the secondary mirror 104, the compensating mirror 106, and the spherical mirror 108 to form an image on an image plane 110.

A first three-dimensional rectangular coordinates system (X,Y,Z) is defined by a location of the primary mirror 102. A vertex of the primary mirror 102 is an origin of the three-dimensional rectangular coordinates system (X,Y,Z). A horizontal line passing through the vertex of the primary mirror 102 is defined as a Z-axis; in the Z-axis, to the left is negative, and to the right is positive. A Y-axis is substantially perpendicular to the Z-axis and in a plane shown in FIG. 1; in the Y-axis, to the upward is positive, and to the downward is negative. An X-axis is substantially perpendicular to a YZ plane; in the X-axis, to the inside is positive, and to the outside is negative.

In the three-dimensional rectangular coordinate system (X,Y,Z), the reflection surface of the compensating mirror 106 is a freeform surface. The freeform surface can be a freeform surface based on a plane or a freeform surface with a large curvature radius. In one embodiment, a reflective surface of the compensating mirror 106 in the first three-dimensional rectangular coordinates system (X,Y,Z) is an xy polynomial freeform surface; and an xy polynomial equation can be expressed as follows:

$$z(x, y) = \frac{c(x^2 + y^2)}{1 + \sqrt{1 - (1 + k)c^2(x^2 + y^2)}} + \sum_{i=1}^{N} A_i x^m y^n$$

In the xy polynomial equation, z represents surface sag, c represents surface curvature, k represents conic constant, while $A_i$ represents the ith term coefficient. Since the freeform surface optical telescope imaging system 100 is symmetrical about a YOZ plane, so only even order terms of x can remain. In one embodiment, the reflective surface of compensating mirror 106 is a fourth-order polynomial freeform surface of xy without odd items of x; and an equation of the fourth-order polynomial freeform surface of xy can be expressed as follows:

$$z(x, y) = \frac{c(x^2 + y^2)}{1 + \sqrt{1 - (1+k)c^2(x^2 + y^2)}} + A_2 y + A_3 x^2 + A_5 y^2 + A_7 x^2 y + A_9 y^3 + A_{10} x^4 + A_{12} x^2 y^2 + A_{14} y^4.$$

In one embodiment, the values of c, k, and Ai in the equation of the fourth-order polynomial freeform surface of xy of the reflective surface of the compensating mirror 106 are listed in TABLE 1, other unlisted coefficients are all 0. However, the values of c, k, and Ai in the fourth order xy polynomial equation are not limited to TABLE 1.

TABLE 1

| c | 0.0068854520299669 |
| --- | --- |
| Conic Constant (k) | 0.130148680498771 |
| $A_2$ | 0.338083764164933 |
| $A_3$ | −0.00272050433148337 |
| $A_5$ | −0.00262488793834259 |
| $A_7$ | 1.953567845767e−006 |
| $A_9$ | 2.22037075536239e−006 |
| $A_{10}$ | −2.52624079993697e−008 |
| $A_{12}$ | −5.02899069469032e−008 |
| $A_{14}$ | −2.16840513996516e−008 |

A reflecting surface of the primary mirror 102 is an aspheric surface, and an equation of the aspheric surface can be expressed as follows:

$$z(x, y) = \frac{c(x^2 + y^2)}{1 + \sqrt{1 - (1+k)c^2(x^2 + y^2)}} + Ar^4 + Br^6 + Cr^8 + \ldots$$

In the equation, z represents surface sag, c represents surface curvature, k represents conic constant. In one embodiment, the values of c, k, a fourth-order coefficient (A), a sixth-order coefficient (B), and an eighth-order coefficient (C) of the quadric surface of the primary mirror 102 are listed in Table 2. However, the values of c, k, fourth-order coefficient (A), sixth-order coefficient (B), and eighth-order coefficient (C) in the equation of the aspheric surface of the primary mirror 102 are not limited to TABLE 2.

TABLE 2

| c | −0.0020874981266865 |
| --- | --- |
| Conic Constant (k) | 13.53821544118 |
| fourth-order coefficient (A) | 1.65833245969156e−008 |
| sixth-order coefficient (B) | 5.14850429042707e−013 |
| eighth-order coefficient (C) | 2.59362258572104e−017 |

A reflecting surface of the secondary mirror 104 is an aspheric surface, and an equation of the aspheric surface can be expressed as follows:

$$z(x, y) = \frac{c(x^2 + y^2)}{1 + \sqrt{1 - (1+k)c^2(x^2 + y^2)}} + Ar^4 + Br^6 + Cr^8 + \ldots$$

In the equation, z represents surface sag, c represents surface curvature, k represents conic constant. In one embodiment, the values of c, k, a fourth-order coefficient (A), a sixth-order coefficient (B), and to eighth-order coefficient (C) of the quadric surface of secondary mirror 104 are listed in Table 3. However, the values of c, k, fourth-order coefficient (A), sixth-order coefficient (B), and eighth-order coefficient (C) in the equation of the aspheric surface of secondary mirror 104 are not limited to TABLE 3.

TABLE 3

| c | −0.006127469485461 |
| --- | --- |
| Conic Constant (k) | 15.273223707775 |
| fourth-order coefficient (A) | 5.07392783277529e−007 |
| sixth-order coefficient (B) | 1.3788426498086e−010 |
| eighth-order coefficient (C) | 7.43026486752561e−014 |

In one embodiment, a spherical radius of the spherical mirror 108 is 202.107528995228 mm.

The freeform surface optical telescope imaging system 100 comprises the compensating mirror 106 and the spherical mirror 108 except for the primary mirror 102 and the secondary mirror 104 of the RC system. With a coordination of the compensating mirror 106 and the spherical mirror 108, the freeform surface optical telescope imaging system 100 can image in a visible light, and a volume of the freeform surface optical telescope imaging system 100 can be reduced, and at the same time, the field of view of the freeform optical telephoto system can be enlarged. In addition, the spherical surface of the spherical mirror 108 is simple to process and easy to assemble.

The materials of the primary mirror 102, the secondary mirror 104, the compensating mirror 106, and the spherical mirror 108 can be aluminum, beryllium or other metals. The materials of the primary mirror 102, the secondary mirror 104, and the compensating mirror 106 can also be silicon carbide, quartz or other inorganic materials. A reflection enhancing coating can also be coated on the metals or inorganic materials to enhance the reflectivity performance of the four mirrors. In one embodiment, the reflection enhancing coating is a gold film. A size of each of the primary mirror 102, the secondary mirror 104, the compensating mirror 106, and the spherical mirror 108 can be designed according to actual needs.

In one embodiment, in the three-dimensional rectangular coordinate system (X, Y, Z), a distance between a center of the primary mirror 102 and a center of the secondary mirror 104 in the Z-axis direction is about 172.7688502009 mm, and a distance between a center of the compensating mirror 106 and a center of the secondary mirror 104 in the Z-axis direction is about 229.89461744494 mm. A center coordinate of a curved surface of the spherical mirror 108 relative to the center of the primary mirror 102 is (0, −26.98936937888, 11.17920203251). An angle between the spherical mirror 108 and the Y-axis is about 22.85965383182°. A center coordinate of a curved surface of the image plane 110 relative to the center of the primary mirror 102 is (0, −25.42232107506, 77.14934754514). An angle between the image plane 110 and the Y axis is about 19.83794409462°.

In one embodiment, an equivalent entrance pupil diameter of the freeform surface optical telescope imaging system 100 is about 86 mm. The freeform surface optical telescope imaging system 100 has a field of view of 1.92°×1.22°, that is, the field of view in the x-axis direction is 1.92°, and the field of view in the y-axis direction is 1.22°. An effective focal length f of the freeform surface optical telescope imaging system 100 is about 850 mm. An F-number of the freeform surface optical telescope imaging system 100 is about 9.88. A working wavelength range of the freeform surface optical telescope imaging system 100 is a visible light.

Figure 2:
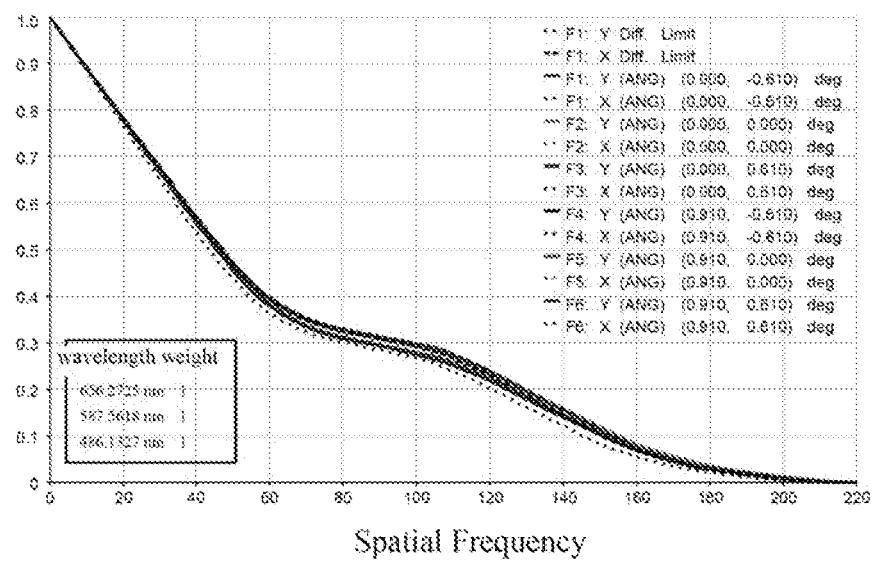
FIG. 2 is a modulation transfer functions (MTF) diagram of the freeform optical telescope imaging system.

FIG. 2 shows the modulation transfer function MTF in the visible light. As shown in FIG. 2, a transfer function of each field of view in the freeform surface optical telescope imaging system 100 is close to a diffraction limit, thus the freeform surface optical telescope imaging system 100 has high imaging quality.

Figure 3:
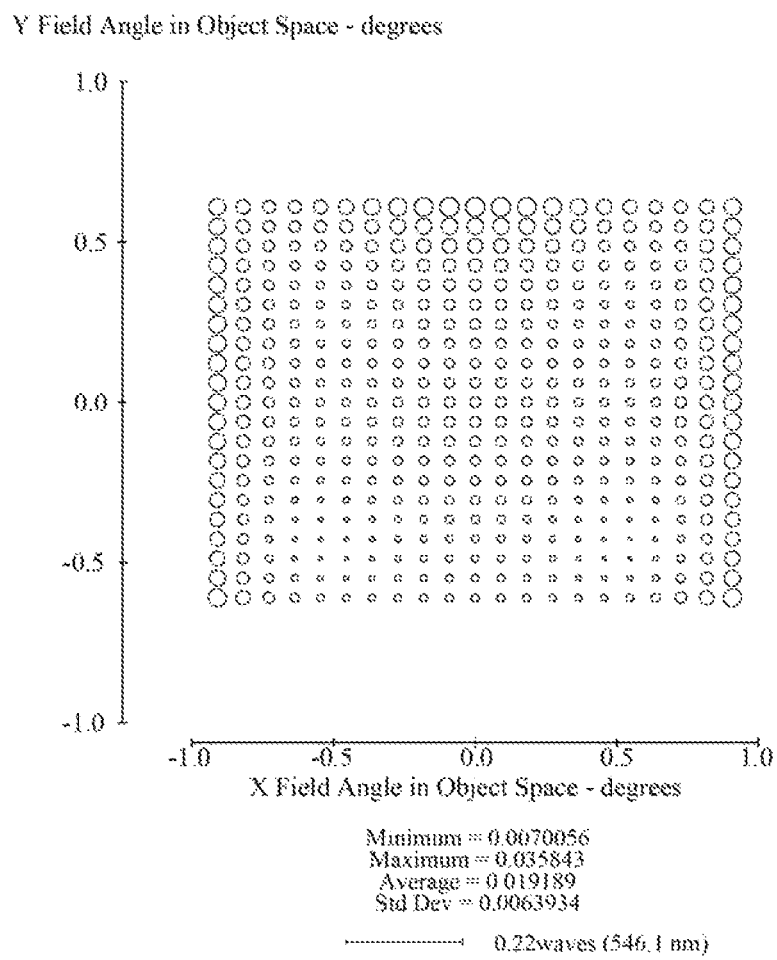
FIG. 3 is a spot diagram of one embodiment of the freeform optical telescope imaging system.

FIG. 3 is a spot diagram of the freeform surface optical telescope imaging system 100. As shown in FIG. 3, a maximum value of an RMS wavefront error is about 0.035843, and an average value of an RMS wavefront error is about 0.01989. Therefore, the freeform surface optical telescope imaging system 100 has relatively small imaging errors and high quality.

The freeform surface optical telescope imaging system 100 uses an optical freeform surface as the compensating mirror, which has more freedom in design than a spherical or aspheric surface. Therefore, it is beneficial to correct aberrations of the freeform surface optical telescope imaging system 100, and the freeform surface optical telescope imaging system 100 can obtain better imaging quality. The freeform surface optical telescope imaging system 100 comprises a freeform surface compensating mirror and a spherical reflector. With the cooperation of the freeform surface compensating mirror and the spherical reflector, the freeform surface optical telescope imaging system 100 can be imaged in the visible light band, and the volume of the freeform surface optical telescope imaging system 100 can be reduced. At the same time, the field of view of the freeform surface optical telescope imaging system 100 can be expanded. In addition, the spherical surface of the spherical mirror is simple to process and easy to assemble. In summary, a combined use of the freeform surface compensating mirror and the spherical mirror makes the freeform surface optical telephoto system have better imaging performance.

The application field of the freeform surface optical telescope imaging system 100 provided by the present invention is not limited to the fields of astronomical observation such as R-C telescopes, but also relates to the fields of earth observation, space target detection, multi-spectral thermal imaging, stereo surveying, and mapping.

Even though numerous characteristics and advantages of certain inventive embodiments have been set out in the foregoing description, together with details of the structures and functions of the embodiments, the disclosure is illustrative only. Changes may be made in detail, especially in matters of an arrangement of parts, within the principles of the present disclosure to the full extent indicated by the broad general meaning of the terms in which the appended claims are expressed.

Depending on the embodiment, certain of the steps of methods described may be removed, others may be added, and the sequence of steps may be altered. It is also to be understood that the description and the claims drawn to a method may comprise some indication in reference to certain steps. However, the indication used is only to be viewed for identification purposes and not as a suggestion as to an order for the steps.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will, therefore, be appreciated that the embodiments described above may be modified within the scope of the claims.

What is claimed is:

1. A freeform surface optical telescope imaging system, comprising:
a primary mirror, a secondary mirror, a compensating mirror and a spherical mirror spaced away from each other, wherein a surface shape of each of the primary mirror and the secondary mirror is a quadric surface, the primary mirror is an aperture stop, a surface shape of the compensating mirror is a freeform surface, a surface shape of the spherical mirror is a spherical surface, a light emitted from a light source is reflected by the primary mirror, the secondary mirror, the compensating mirror, and the spherical mirror to form an image on a image plane, and an F-number of view of the freeform surface optical telescope imaging system is about 9.88.

2. The freeform surface optical telescope imaging system of claim 1, wherein a first three-dimensional rectangular coordinates system (X,Y,Z) is defined by a location of the primary mirror, a vertex of the primary mirror is an origin of the three-dimensional rectangular coordinates system (X,Y,Z), a reflective surface of the compensating mirror is an xy polynomial freeform surface; and an xy polynomial equation is $$z(x, y) = \frac{c(x^2 + y^2)}{1 + \sqrt{1 - (1+k)c^2(x^2 + y^2)}} + \sum_{i=1}^{N} A_i x^m y^n,$$

wherein z represents surface sag, c represents surface curvature, k represents conic constant, and Ai represents an ith term coefficient.

3. The freeform surface optical telescope imaging system of claim 2, wherein the reflective surface of compensating mirror is a fourth-order polynomial freeform surface of xy without odd items of x; and an equation of the fourth-order polynomial freeform surface of xy is:

$$z(x, y) = \frac{c(x^2 + y^2)}{1 + \sqrt{1 - (1+k)c^2(x^2 + y^2)}} + A_2 y +$$
$$A_3 x^2 + A_5 y^2 + A_7 x^2 y + A_9 y^3 + A_{10} x^4 + A_{12} x^2 y^2 + A_{14} y^4,$$

wherein c=0.0068854520299669, k=0.130148680498771, $A_2$=0.338083764164933, $A_3$=−0.00272050433148337, $A_5$=−0.00262488793834259, $A_7$=1.953567845767e-006, $A_9$=2.22037075536239e-006, $A_{10}$=−2.52624079993697e-008, $A_{12}$=−5.02899069469032e-008, and $A_{14}$=−2.16840513996516e-008.

4. The freeform surface off-axial three-mirror imaging system of claim 1, wherein a reflecting surface of the primary mirror is an aspheric surface, and an equation of the aspheric surface is:

$$z(x, y) = \frac{c(x^2 + y^2)}{1 + \sqrt{1 - (1+k)c^2(x^2 + y^2)}} + Ar^4 + Br^6 + Cr^8 + \ldots,$$

wherein z represents surface sag, c represents surface curvature, c=−0.0020874981266865, k represents conic constant, k=13.53821544118, fourth-order coefficient A=1.65833245969156e-008, sixth-order coefficient B=5.14850429042707e-013, and eighth-order coefficient C=2.59362258572104e-017.

5. The freeform surface optical telescope imaging system of claim 1, wherein a reflecting surface of the secondary mirror is an aspheric surface, and an equation of the aspheric surface is:

$$z(x, y) = \frac{c(x^2 + y^2)}{1 + \sqrt{1 - (1 + k)c^2(x^2 + y^2)}} + Ar^4 + Br^6 + Cr^8 + \ldots,$$

wherein z represents surface sag, c represents surface curvature, c=−0.006127469485461, k represents conic constant, k=15.273223707775, fourth-order coefficient A=5.07392783277529e-007, sixth-order coefficient B=1.3788426498086e-010, and eighth-order coefficient C=7.43026486752561e-014.

6. The freeform surface optical telescope imaging system of claim 2, wherein in the three-dimensional rectangular coordinate system (X, Y, Z), a distance between a center of the primary mirror and a center of the secondary mirror in the Z-axis direction is about 172.7688502009 mm.

7. The freeform surface optical telescope imaging system of claim 2, wherein in the three-dimensional rectangular coordinate system (X, Y, Z), a distance between a center of the compensating mirror and a center of the secondary mirror in the Z-axis direction is about 229.89461744494 mm.

8. The freeform surface optical telescope imaging system of claim 2, wherein in the three-dimensional rectangular coordinate system (X, Y, Z), a center coordinate of a curved surface of the spherical mirror relative to the center of the main mirror is (0, −26.98936937888, 11.17920203251).

9. The freeform surface optical telescope imaging system of claim 1, wherein an angle between the spherical mirror and the Y-axis is about 22.85965383182°.

10. The freeform surface optical telescope imaging system of claim 2, wherein in the three-dimensional rectangular coordinate system (X, Y, Z), a center coordinate of a curved surface of the image plane relative to the center of the main mirror is (0, −25.42232107506, 77.14934754514).

11. The freeform surface optical telescope imaging system of claim 1, wherein an angle between the image plane and the Y axis is about 19.83794409462°.

12. The freeform surface optical telescope imaging system of claim 1, wherein a field of view of the freeform surface optical telescope imaging system is 1.92°×1.22°.

13. The freeform surface optical telescope imaging system of claim 1, wherein an effective focal length f of the freeform surface optical telescope imaging system is about 850 mm.

14. The freeform surface optical telescope imaging system of claim 1, wherein an equivalent entrance pupil diameter of the freeform surface optical telescope imaging system is about 86 mm.

15. The freeform surface optical telescope imaging system of claim 1, wherein a spherical radius of the spherical mirror is 202.107528995228 mm.

* * * * *